(12) United States Patent
Brumfield (10) Patent No.: US 9,429,745 B2
(45) Date of Patent: Aug. 30, 2016

(54) VARIABLE RETICLE FOR OPTICAL SIGHTING DEVICES RESPONSIVE TO OPTICAL MAGNIFICATION ADJUSTMENT

(75) Inventor: Richard B. Brumfield, Rockwall, TX (US)

(73) Assignee: Leupold & Stevens, Inc., Beaverton, OR (US)

( * ) Notice: Subject to any disclaimer, the term of this patent is extended or adjusted under 35 U.S.C. 154(b) by 280 days.

(21) Appl. No.: 13/564,594

(22) Filed: Aug. 1, 2012

(65) Prior Publication Data

US 2013/0033746 A1 Feb. 7, 2013

Related U.S. Application Data

(60) Provisional application No. 61/514,273, filed on Aug. 2, 2011.

(51) Int. Cl.
*G02B 23/02* (2006.01)
*G02B 23/10* (2006.01)
*F41G 1/38* (2006.01)
*G02B 27/36* (2006.01)

(52) U.S. Cl.
CPC ............. *G02B 23/105* (2013.01); *F41G 1/38* (2013.01); *G02B 27/36* (2013.01)

(58) Field of Classification Search
CPC .... G02B 23/105; G02B 27/34; G02B 23/14; G02B 27/30; G02B 23/00; G02B 27/01; G02B 5/30; G02B 17/045; G02B 23/18; G02B 27/1066
USPC .......... 359/399–429, 505; 42/111, 115, 123, 42/146
See application file for complete search history.

(56) References Cited

U.S. PATENT DOCUMENTS

| | | | |
|---|---|---|---|
| 3,313,026 A | 4/1967 | Akin, Jr. | |
| 3,340,614 A | 9/1967 | Leatherwood | |
| 3,431,652 A | 3/1969 | Leatherwood | |
| 3,492,733 A | 2/1970 | Leatherwood | |
| 3,672,782 A | 6/1972 | Akin, Jr. | |

(Continued)

FOREIGN PATENT DOCUMENTS

CN 102057246 A 5/2011
DE 202008012601 U1 11/2008

(Continued)

OTHER PUBLICATIONS

Premier Reticles Ltd., "Why Settle When You Can Have a V8!", http://mvw.premierreticles.com/pdfs/2010-V81-8x.pdf, published online at least as early as Jun. 12, 2010, 1 page.

*Primary Examiner* — Scott J Sugarman
*Assistant Examiner* — Mustak Choudhury
(74) *Attorney, Agent, or Firm* — Stoel Rives (57) ABSTRACT

An optical sighting device includes an electronic controller that is responsive to changes in an optical magnification of the sighting device to resize at least a portion of a reticle produced by an electronic display or other means proximate a focal plane of the sighting device. In some embodiments, the reticle is located proximate a rear focal plane of the sighting device and may be scaled by the electronic controller in concert with changes in optical magnification to simulate a front focal plane reticle. A functional pattern of the reticle may also be automatically changed at different magnification settings to provide different types of reticles, such as CQB and sniper reticles, in a single optical device.

21 Claims, 6 Drawing Sheets

(56) References Cited

U.S. PATENT DOCUMENTS

| | | |
|---|---|---|
| 3,782,822 A | 1/1974 | Spence |
| 4,403,421 A | 9/1983 | Shepherd |
| 4,497,548 A | 2/1985 | Burris |
| 6,516,551 B2 | 2/2003 | Gaber |
| 7,269,920 B2 | 9/2007 | Staley, III |
| 7,386,953 B2 | 6/2008 | Ball |
| 7,654,029 B2 | 2/2010 | Peters et al. |
| 7,676,137 B2 | 3/2010 | Schick et al. |
| 7,738,082 B1 | 6/2010 | Peters |
| 8,833,655 B2 | 9/2014 | McCarty et al. |
| 9,091,507 B2 | 7/2015 | Paterson et al. |
| 2005/0018041 A1 | 1/2005 | Towery et al. |
| 2005/0094262 A1 | 5/2005 | Spediacci et al. |
| 2005/0213962 A1 | 9/2005 | Gordon |
| 2005/0219690 A1 | 10/2005 | Lin et al. |
| 2005/0229468 A1 | 10/2005 | Zaderey et al. |
| 2005/0252062 A1 | 11/2005 | Scrogin et al. |
| 2005/0268521 A1 | 12/2005 | Cox et al. |
| 2006/0260171 A1 | 11/2006 | Cole et al. |
| 2008/0098640 A1* | 5/2008 | Sammut et al. ............... 42/122 |
| 2010/0149634 A1 | 6/2010 | Tang et al. |
| 2011/0089238 A1 | 4/2011 | Sammut et al. |
| 2011/0296733 A1 | 12/2011 | York |
| 2012/0030985 A1 | 2/2012 | Mauricio et al. |
| 2012/0033195 A1 | 2/2012 | Tai |
| 2012/0255213 A1* | 10/2012 | Panos ............... 42/115 |
| 2012/0298750 A1 | 11/2012 | McCarty et al. |
| 2012/0314283 A1* | 12/2012 | Jahromi ............... 359/422 |
| 2013/0199074 A1 | 8/2013 | Paterson et al. |
| 2015/0002856 A1 | 1/2015 | McCarthy et al. |
| 2016/0025455 A1 | 1/2016 | Paterson et al. |

FOREIGN PATENT DOCUMENTS

| | | |
|---|---|---|
| RU | 2 313 754 C2 | 12/2007 |
| TW | I263031 B | 10/2006 |
| TW | 201022716 A | 6/2010 |

* cited by examiner

FIG. 5A (10X MAG.)

FIG. 5B (2X MAG.)

FIG. 5C (10X MAG.)

FIG. 5D (2X MAG.)

Low Power (1X-2.9X MAG.)

FIG. 9A

Low-Mid Power (3X MAG.)

FIG. 9B

Mid Power (6X MAG.)

FIG. 9C

High Power (8X MAG.)

FIG. 9D

VARIABLE RETICLE FOR OPTICAL SIGHTING DEVICES RESPONSIVE TO OPTICAL MAGNIFICATION ADJUSTMENT

RELATED APPLICATION

This application claims the benefit under 35 U.S.C. §119(e) from U.S. Provisional Patent Application No. 61/514,273, filed Aug. 2, 2011, which is incorporated herein by reference.

TECHNICAL FIELD

The field of the present disclosure relates to riflescopes and other direct view optical sighting devices, and to reticles for optical sighting devices.

BACKGROUND

Optical sighting devices such as riflescopes are often used to aid the aiming of weapons, such as rifles, pistols, bows, or the like. Such optical sighting devices typically include reticles, which may take various forms, such as cross-hairs, posts, circles, horseshoes, a dot, or other suitable shapes, to help a shooter aim at the target. In addition to riflescopes, reticles are also sometimes included in binoculars, spotting scopes and other optical sighting devices, particularly such devices used by a spotter of a spotter-shooter team to assist a shooter in aiming a weapon using a separate riflescope. Some reticles include various marks, such as optical range finding marks to facilitate estimating a distance to a target of known size, holdover aiming marks for adjusting for the ballistic drop of a projectile for targets located at various ranges from the shooter, and various other marks to assist the shooter in acquiring information, or adjusting for variables relating to weapon inclination, crosswinds, or other shooting conditions.

In a typical arrangement, a riflescope includes an objective that forms an inverted image of a distant target at a front focal plane behind the objective, and an image-erecting lens or prism assembly located between the front focal plane and an eyepiece of the riflescope. The erecting lens assembly or prism assembly erects the inverted image of the target to form an erect image at a rear focal plane viewable through the eyepiece in a field of view thereof. In a variable-power riflescope, lens elements of the erector assembly are movable along their optical axis to change a magnification of the image at the rear focal plane. The riflescope may include a reticle at either the front focal plane, the rear focal plane, or both.

When the reticle is located at the front focal plane (FFP reticle), its apparent size viewed through the eyepiece is affected by adjustments to the optical magnification to the same degree as the image of the distant target. In essence, the apparent size of both the image and the FFP reticle will be scaled with changes in magnification so that a user will perceive that the reticle covers (that is, overlies or obstructs) the same portion of the distant target regardless of changes in the optical magnification.

On the other hand, a riflescope with a reticle positioned at the rear focal plane (RFP reticle) has different characteristics. In particular, since the reticle is displayed at the rear focal plane behind the erector assembly, any changes in magnification or focus typically do not affect the apparent size of the RFP reticle as viewed through the eyepiece. Accordingly, when the user increases the image magnification by moving elements of the erector assembly, the apparent size of the target will be enlarged, but the apparent size of the RFP reticle in the field of view will remain unchanged. The RFP reticle will simply be superposed on the magnified erect image at the rear focal plane and the user will see the same reticle size regardless of the magnification. In such cases, the user will perceive that the RFP reticle covers (that is, overlies or obstructs) different amounts or portions of the distant target as the amount of optical magnification changes.

In some instances, it may be desirable to include the reticle in the front focal plane so that the reticle scales in size with the target so as to not disorient the shooter. In other instances, it may be desirable to include the reticle in the rear focal plane so that the apparent size of the reticle is not changed when the image is magnified.

The present inventors have identified a need for an improved optical sighting device that combines selected features of an FFP reticle and an RFP reticle to provide enhanced features and/or flexibility for a user.

SUMMARY

Embodiments of a variable power optical sighting device according to the present disclosure comprise a sensor associated with a magnification adjustment mechanism of the sighting device to produce a signal indicative of an adjustment of the optical magnification of the sighting device. The sighting device further includes an electronic controller in communication with the sensor. The electronic controller is operable, in response to the signal produced by the sensor, to resize at least a portion of a reticle positioned proximate a focal plane of the sighting device, which reticle is viewable through an eyepiece in a field of view thereof superimposed upon an image of a distant object.

The electronic controller may continuously resize at least a portion of the reticle at the focal plane in response to the signal indicating continuous adjustments of the optical magnification. For example, the reticle may be disposed proximate a rear focal plane of a riflescope, in which an erector assembly is responsive to the magnification adjustment mechanism for magnifying the image of the object, and the electronic controller may be configured to resize the reticle at the rear focal plane so as to change the apparent size of the reticle in the field of view of the eyepiece in concert with changes in the optical magnification of the sighting device.

In some embodiments, the reticle is produced by an electronic reticle display facing a beam combiner disposed proximate the focal plane. In other embodiments, the reticle may include a transparent electronic reticle display positioned in an optical path of the sighting device at the focal plane. The electronic reticle display may comprise a pixel array for producing the reticle, such as an OLED pixel array or other pixelated display device.

In some embodiments, the electronic controller is configured to produce a first set of multiple marks on the electronic reticle display to form a first reticle pattern, such as a close-quarters reticle pattern, in response to the signal indicating a first magnification setting; and, in response to the signal indicating a second magnification setting greater than the first magnification setting, the electronic controller may remove the first set of multiple marks and produce a second set of multiple marks on the electronic reticle display to form a second reticle pattern that is distinct from the first reticle pattern. For example, the second reticle pattern may be a long-range reticle pattern, such as a sniper reticle.

In some embodiments, three or more different reticle patterns may be produced in response to adjustment of the optical magnification to three or more different settings or ranges of settings.

Any number of reticle patterns may be stored on a memory associated with the electronic controller. The number of reticle patterns that change size congruent with magnification changes may also vary. Also, the different reticle patterns displayed may be user-selectable and/or user-definable (i.e., customizable).

Additional aspects and advantages will be apparent from the following detailed description of preferred embodiments, which proceeds with reference to the accompanying drawings.

DETAILED DESCRIPTION OF PREFERRED EMBODIMENTS

With reference to the drawings, this section describes particular embodiments and their detailed construction and operation. The embodiments described herein are set forth by way of illustration only and not limitation. The described features, structures, characteristics, and methods of operation may be combined in any suitable manner in one or more embodiments. In view of the disclosure herein, those skilled in the art will recognize that the various embodiments can be practiced without one or more of the specific details or with other methods, components, materials, or the like. In other instances, well-known structures, materials, or methods of operation are not shown or not described in detail to avoid obscuring more pertinent aspects of the embodiments.

Figure 1:
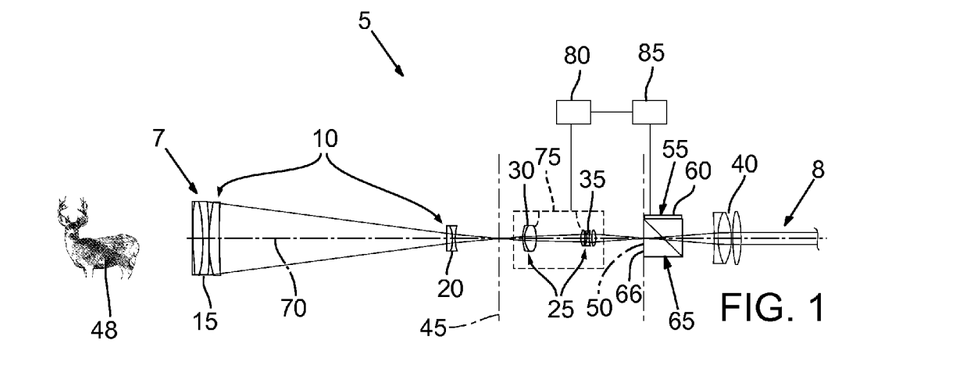
FIG. 1 is a side schematic view of a riflescope according to one embodiment.
Figure 2:
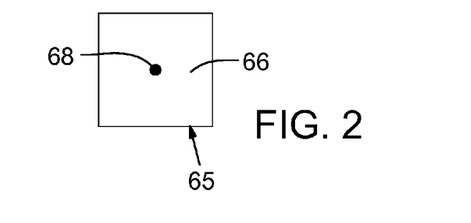
FIG. 2 is front view of a beam-combiner of the riflescope of FIG. 1.
Figure 3:
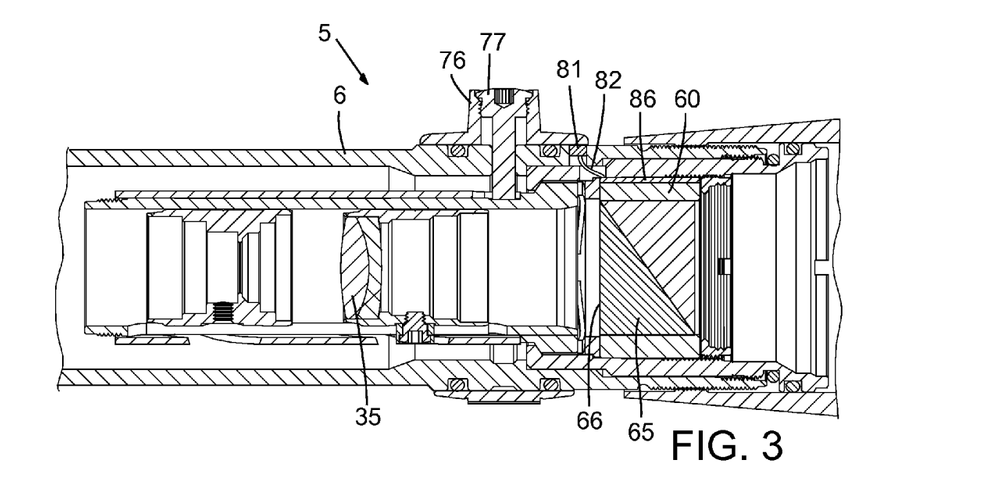
FIG. 3 is a partial side section elevation of an eyepiece end of a riflescope in accordance with the embodiment of FIG. 1.

For convenience, the following discussion references riflescopes as a prototypical direct view optical aiming device. However, the following details and descriptions may be applied to other suitable optical sighting devices. Generally, a direct view optical sighting device includes one or more lenses, prisms, or other optical components that operate to enhance the human eye and may include pistol scopes, spotting scopes, rangefinders, bow sights, or other riflescopes that differ from those specifically discussed herein. FIGS. 1-3 collectively illustrate an example embodiment of a riflescope according to the present disclosure. With reference to FIGS. 1-3, a riflescope 5 includes a typically elongated and tubular housing 6 (FIG. 3) supporting an objective 10 adjacent a target-facing end of the housing 6, an eyepiece 40 adjacent a viewing end 8 of the housing 6, and an erector assembly 25 therebetween. The objective 10 may include a primary objective lens system 15 and a field lens 20 to aid in gathering and directing light to a front focal plane 45 of the riflescope 5, whereat the objective 10 produces an image of a distant object or target 48. At the front focal plane 45, the image is inverted, i.e., the image is upside down and switched left from right. The erector assembly 25 is located behind the front focal plane 45 and is operable to reorient the image of the object 48 by producing an erect image thereof at the rear focal plane 50 behind the erector assembly 25, so that the top and bottom of the image at the rear focal plane 50 corresponds to the top and bottom of the actual target as normally perceived with the naked eye. The eyepiece 40 facilitates viewing of the erect image and provides eye relief, which is a distance behind the eyepiece 40 at which, when a viewer's eye is placed there, the erect image formed at the rear focal plane appears to "fill" the eyepiece 40 to provide a full view of the erect image.

The erector assembly 25 may include one or more movable optical elements, such as a focus lens 30 that is movable along its optical axis to adjust the focus of the image and a magnification lens 35 movable along its optical axis to optically magnify the image at the rear focal plane 50 so that the target appears closer than its actual distance. Typically, the erector assembly 25 includes a mechanical, electro-mechanical, or electro-optical system to drive cooperative movement of both the focus lens 30 and one or more power-varying lens elements of the magnification lens 35 to provide a continuously variable magnification range throughout which the erector assembly 25 produces a focused, erect image of the distant target at the rear focal plane 50. In some riflescopes, however, the magnification adjustment may not be continuous, but may instead produce two or more discrete optical magnification settings. For example, a riflescope may include a magnification lens that is removed from or inserted into the optical path to switch the optical magnification from a first setting to a second setting, such as described in U.S. Pat. No. 7,869,125. In other riflescopes, a power-varying lens element may be driven by other means to provide magnification adjustment, such as an adjustable liquid lens which is driven by electrical input to change its shape via the electrowetting principle, for example.

The riflescope 5 includes an electronic display 55, which may be located proximate or at the rear focal plane 50. The electronic display 55 includes an electronic display screen 60 positioned above a central optical axis 70 and generates an image display of a reticle 90 (see for example FIGS. 6 and 7). The display screen 60 faces a top surface of a beam-combiner 65, which is mounted in the optical path of riflescope 5 so that the central optical axis 70 of the riflescope 5 intersects a center of beam combiner 65. In some embodiments, the display screen 60 may include a micro-OLED (organic light emitting diode) display including a light-emitting pixel array. In other embodiments, the display screen 60 may include an LED display with a collection of selectively activatable discrete segments. Other suitable electronic displays that display a reticle, such as a light-modulating electronic display device or a holographic display may be used. In still other embodiments, the display screen 60 may include a different type of electronically controllable display.

Figure 8:
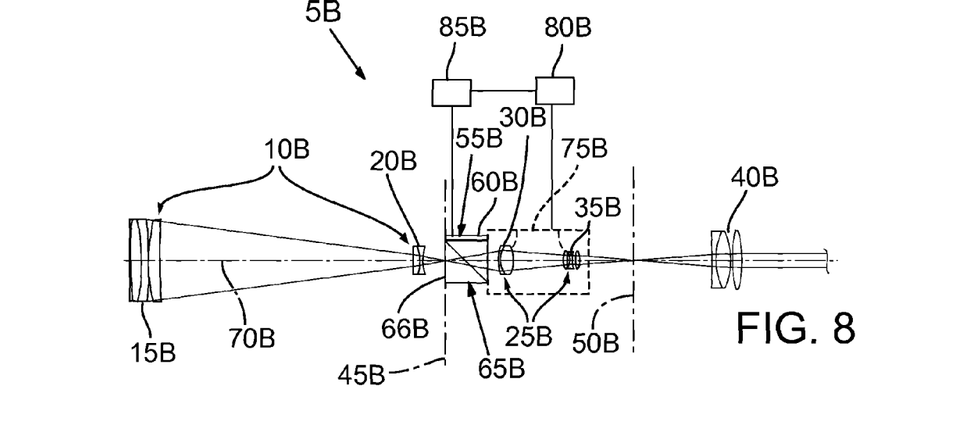
FIG. 8 illustrates a schematic view of an exemplary optical aiming device with an electronic reticle at the front focal plane.

The reticle 90 may be displayed at the rear focal plane 50, or alternatively at the front focal plane 45, as illustrated in FIG. 8 (discussed below) wherein the display screen 60B and beam combiner 65B are located proximate the front focal plane 45B.

In one configuration, a front surface 66 of the beam-combiner 65 is located within a range of approximately 5 mm in front of (i.e., toward the erector assembly 25) the rear focal plane 50 to approximately 5 mm behind (i.e., toward the eyepiece 40) the rear focal plane 50. In another configuration, the front surface 66 of the beam-combiner 65 may be coincident with the rear focal plane 50, as illustrated in FIG. 1, preferably within an acceptable error tolerance not affecting the focus or performance of the reticle 90 in the field of view. It should be understood that the foregoing description of a particular placement of the reticle 90 and beam combiner 65 at the rear focal plane 50 is for illustration purposes and not intended to be limiting except to the extent expressly claimed.

Beam combiner 65 may comprise a beam splitter cube or another type of beam splitter, such as a pellicle or angled dichroic mirror. Preferably, the display screen 60 produces the display of reticle 90 with a specific wavelength of light that is efficiently reflected by beam combiner, whereas the beam splitter's reflective surface is highly transmissive to other wavelengths of visible light from which the image of the target is formed.

The riflescope 5 further includes an optical magnification adjustment mechanism 75 operatively connected to the erector assembly 25 for manipulating or adjusting the optical magnification (colloquially referred to as optical zoom or optical power) of the riflescope 5. The magnification adjustment mechanism 75 may include a power selector ring 76 and a drive pin 77 (see FIG. 3) mounted on the power selector ring 76 and protruding through a slot (not shown) which partly circumscribes the housing 6. In an example configuration, rotation of the power selector ring 76 circumferentially about the housing 6 moves the drive pin 77 within the slot to rotate a cam sleeve (not shown) which in turn drives other components to adjust one or more power-varying optical elements of the erector assembly 25 and the magnification lens 35. Further details and example configurations for the magnification adjustment mechanism 75 and power selector ring 76 are described in U.S. Pat. No. 6,005,711 of Mai et al., issued Dec. 21, 1999, which is fully incorporated herein by reference. While the illustrated embodiments of a magnification adjustment mechanism 75 (also referred to as a zoom selector) are mechanical in nature and hand operated, other suitable zoom selectors may include motor driven zoom selectors, electro-mechanical zoom selectors or electro-optical zoom selectors.

Figure 4:
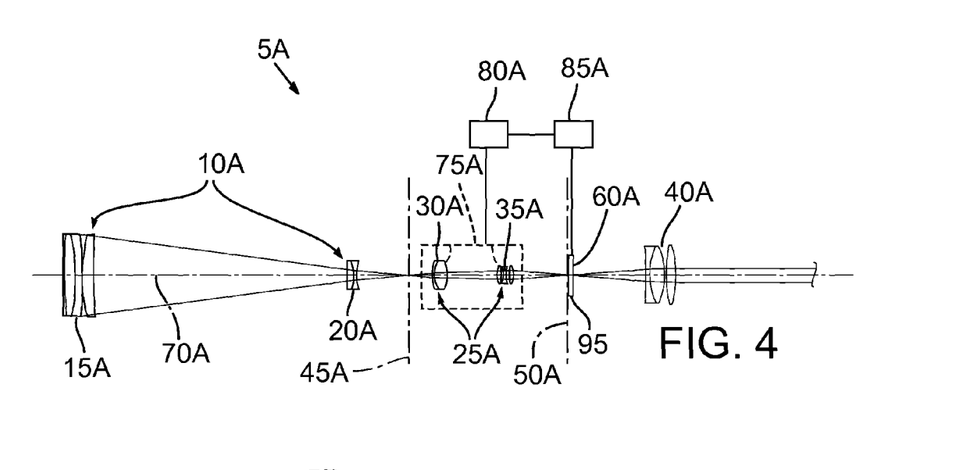
FIG. 4 is a side schematic view of a riflescope according to another embodiment.

In one embodiment, illustrated in FIG. 4, the display screen 60A of riflescope 5A includes a transparent electronic reticle display, such as a pixelated transparent micro-OLED display, positioned in the optical path intersecting optical axis 70A and coincident with or proximate the rear focal plane 50A, in which case the beam combiner 65 of the embodiment of FIG. 1 may be omitted. It should be understood that the riflescope 5A of FIG. 4 comprises substantially similar components as the riflescope 5 of FIG. 1, with like components numbered accordingly with an "A" suffix, except as otherwise expressly noted. Some components of the embodiment of FIG. 4 are not be described herein in detail to avoid obscuring pertinent aspects of the embodiment.

As briefly mentioned previously, displaying the reticle 90 in either the front focal plane 45 or the rear focal plane 50 may have an effect on the characteristics of the reticle 90 as viewed by a shooter via the eyepiece 40. An illustration of these effects is presented below with reference to FIGS. 5A, 5B, 5C and 5D.

Figure 5A:
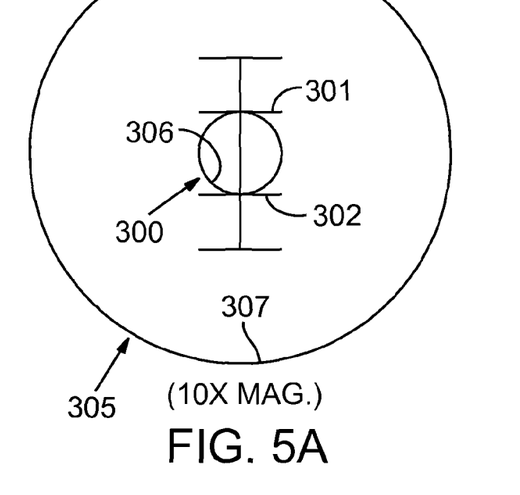
FIGS. 5A and 5B illustrate how spaced marks of a conventional FFP reticle of a riflescope subtend a constant angle in object space (the same linear dimension on a target) as magnification changes.

FIG. 5A illustrates a view of a conventional ranging reticle 300 located at the front focal plane 45 of the riflescope 5. The ranging reticle 300 is constructed so that a top hash mark 301 is spaced apart from a bottom hash mark 302 such that the hash marks 301, 302 collectively bracket an object that is 10 centimeters high when the object is 100 meters from an observer viewing the object at 10× magnification. In FIG. 5A, the center circle of a target 305 includes an inner circle 306 having a 10-centimeter diameter surrounded by an outer circle 307 having a 50-centimeter diameter.

Figure 5B:
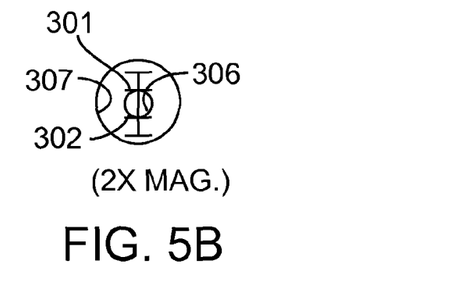

Because the ranging reticle 300 is located at the front focal plane 45, when the magnification of the riflescope 5 is reduced from 10× magnification to 2× magnification, the apparent size of the ranging reticle 300 decreases proportionally with the apparent size change of the target 305, that is, both the apparent size of the target 305 and of the reticle 300 decrease by 5 times (or are ⅕ their previous size). Accordingly, the entire image is reduced and the top hash mark 301 and the bottom hash mark 302 still bracket the 10 centimeter circle 306 when the magnification setting is at 2× magnification. In other words, the viewed distance or angle in object space spanned by a pair of reticle marks or features (i.e., subtended by the marks or features) remains the same regardless of the optical magnification setting of the riflescope when a reticle is located at or proximate the front focal plane. Such a front focal plane reticle (FFP reticle) may, for example, be used directly to accurately determine the range to a target of known or estimable size regardless of the magnification setting of the rifle scope.

Figure 5C:
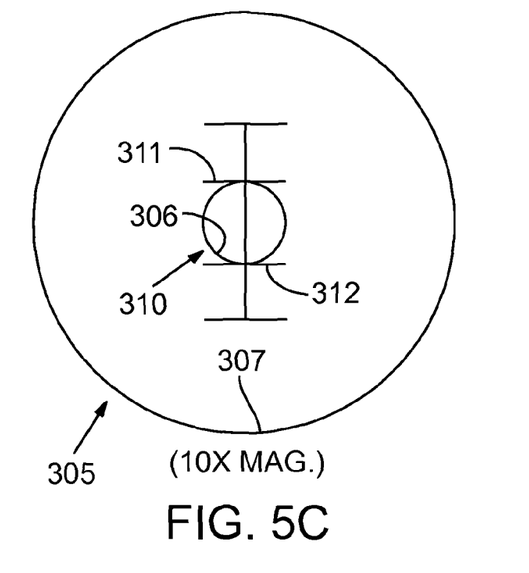
FIGS. 5C and 5D illustrate how spaced marks of a conventional RFP reticle of a riflescope subtend different angles in object space (different linear dimensions on a target) as magnification is adjusted.
Figure 5D:
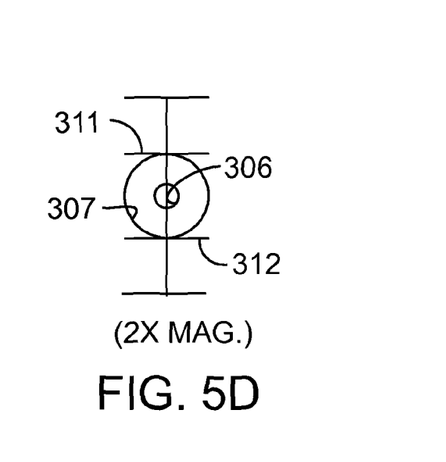

In contrast, FIGS. 5C and 5D illustrate a conventional ranging reticle 310 positioned on the rear focal plane 45 (an RFP reticle) and showing varying subtension as the optical magnification is changed. Similar to the ranging reticle 300, the ranging reticle 310 is constructed so that top hash mark 311 is spaced apart from bottom hash mark 312 such that they bracket an object that is 10 centimeters high when the object is 100 meters from an observer viewing the object at 10× magnification. However, because the ranging reticle 310 is located at the rear focal plane 50, when the magnification of the riflescope 5 is decreased from 10× magnification to 2× magnification, the apparent size of the target 305 decreases by 5 times its previous size, but the apparent size of the ranging reticle 310 remains the same. Accordingly, the top hash mark 311 and the bottom hash mark 312 now bracket the outer circle 307 (which is five times taller than the inner circle) and the hash marks 311, 312 occupy a much larger portion of the target 305.

As illustrated in FIGS. 5C and 5D, two marks of an RFP reticle that span 10 centimeters of a target when a rifle scope is at 10× magnification will span 50 centimeters of the same target (at the same distance) when the rifle scope is at 2× magnification. Conventional rear focal plane ranging reticles typically have an intended subtension that is achieved at a particular magnification setting, commonly the highest magnification of the scope, and can be used directly to estimate the range to a target of known or estimable size only when the scope is set at the particular magnification setting. At other magnification settings, such a rear focal plane ranging reticle generally cannot be used to directly determine the range to a target of known or estimable size without additional calculations.

Turning again to FIGS. 1-4 and 6-7, and based on the various characteristics as described for an FFP reticle and an RFP reticle, the reticle 90 of riflescope 5, 5A, 5B may be electronically displayed at either of the front or rear focal planes 45 or 50 and driven by the electronic controller 85 to operate so that the reticle 90 mimics one of an FFP reticle or an RFP reticle regardless of at which focal plane 45, 50 the reticle 90 is displayed. For instance, the reticle 90 may be displayed at the rear focal plane 50 and the riflescope 5 configured so that adjusting the optical magnification of the riflescope 5 alters the size of the reticle 90 at the rear focal plane 50 (or at least a portion of the reticle 90) so the shooter perceives a change in apparent size of the reticle 90 in the field of view of eyepiece 40, thereby mimicking a typical FFP reticle. Alternatively, with reference to FIG. 8, the reticle 90 may be displayed at the front focal plane 45B and the riflescope 5B may be configured so that the size of the reticle 90 at the front focal plane 45B is altered so the shooter perceives no change in apparent size of the reticle 90 in the field of view of eyepiece 40B, thereby mimicking the behavior of an RFP reticle using an FFP reticle. Additional details and examples are discussed below.

With particular reference to FIGS. 1 and 3, the riflescope 5 includes a sensor 80 in communication with an electronic controller 85 configured to receive any signals or other output from the sensor 80. The sensor 80 is in turn operatively associated with the magnification adjustment mechanism 75 and configured to sense or detect an adjustment (i.e., a movement or change) of the optical magnification of the riflescope 5. In response to the adjustment, the sensor 80 produces a signal indicative of the adjustment. The signal is received by the electronic controller 85 indicating that the magnification adjustment mechanism 75 has been adjusted. The signal may include information such as the amount of adjustment made via the magnification adjustment mechanism 75 and/or the current optical magnification setting of the riflescope 5. The sensor 80 may generate signals on a continuous basis (i.e., for all positions or adjustments) or on a discrete basis (i.e., for selected or threshold positions or adjustments). The electronic controller 85 may continuously resize the reticle 90 in response to the signal indicating a continuous adjustment of the optical magnification of riflescope 5.

In some embodiments, the sensor 80 may include an electro-mechanical or optical digital encoder (which may be rotational or linear), a potentiometer, a combination of one or more magnets and one or more hall effect sensors, or other suitable device operable for sensing the position or movement of the magnification adjustment mechanism 75 and producing a corresponding electrical signal.

With particular reference to FIG. 3, in one example configuration, a digital encoder 81 (which functions as the sensor 80) is operatively associated with the magnification adjustment mechanism 75 (which includes power selector ring 76 and drive pin 77). The digital encoder 81 is also in communication with a processor board 86 (which functions as the electronic controller 85) via a flex cable 82. In an example operation, when the power selector ring 76 is rotated or adjusted, the optical magnification setting of the riflescope 5 is adjusted and the digital encoder 81 generates a signal with information relating to the adjustment. The signal is received by the processor board 86, which controls the size of the reticle 90 displayed proximate the focal plane 50.

To mimic an FFP reticle, the electronic controller 85 (or processor board 86) adjusts the size of the reticle 90 at the rear focal plane 50 so that the user perceives the reticle 90 as directly scaling with the optical magnification. In other words, the electronic controller 85 enlarges the size of the reticle 90 in concert with an increase in optical magnification or zoom and reduces the size of the reticle 90 in concert with a decrease in zoom. Accordingly, even though the reticle 90 is displayed at the rear focal plane 50 and unaffected by the erector assembly 25, the shooter perceives a change in apparent size of the reticle 90 that is proportional to adjustments of the optical magnification, such that the apparent size of the reticle in the field of view is changed to the same degree as the apparent size of the object in the field of view.

In another configuration, the electronic reticle 90 may be displayed at the front focal plane 45B as illustrated in FIG. 8, and the riflescope 5B may be configured so that the reticle 90 mimics an RFP reticle. It should be understood that the riflescope 5B comprises substantially similar components (with like components numbered accordingly) as the riflescope 5, except as otherwise expressly noted. Accordingly, some components may not be described herein in detail to avoid obscuring pertinent aspects of the embodiment.

With reference to FIG. 8, the riflescope 5B includes an electronic display 55B, and a beam combiner 65B positioned proximate the front focal plane 45B. The electronic display 55B includes an electronic display screen 60B positioned above a central optical axis 70B. Display screen 60B is driven by electronic controller 85B to display a reticle 90 (see for example FIGS. 6 and 7). The display screen 60B faces a top surface of the beam combiner 65B, which is mounted in the optical path of riflescope 5B so that the central optical axis 70B of the riflescope 5B intersects a center of the beam combiner 65B. A front surface 66B of beam combiner 65B may preferably be coincident with front focal plane 45B.

In operation, the electronic controller 85B resizes at least a visible portion of the reticle 90 at the front focal plane 45B to inversely scale with optical magnification. In other words, the electronic controller 85B reduces the size of the reticle 90 displayed at the front focal plane 45B in concert with an increase in zoom and enlarges the size of the reticle in concert with a decrease in zoom. Because the reticle 90 is in the front focal plane 45B, the image of the reticle 90 will be modified via the erector assembly 25B and the magnification lens 35B and those modifications are taken into account. The viewer perceives a change in the size of the target image but no change in apparent size of the reticle 90, thereby mimicking a RFP reticle. Accordingly, with an increase in zoom, the reticle 90 at the front focal plane 45B is reduced (in comparison with the target image) so that when both are magnified via the erector assembly 25B, the image of the target appears magnified, but the image of the reticle 90 appears unaffected by the changes in optical magnification when viewed via the eyepiece system 40B. Similarly, with a decrease in zoom, the reticle 90 at the front focal plane 45B is enlarged so as to appear unchanged when viewed via the eyepiece system 40B.

Figure 6:
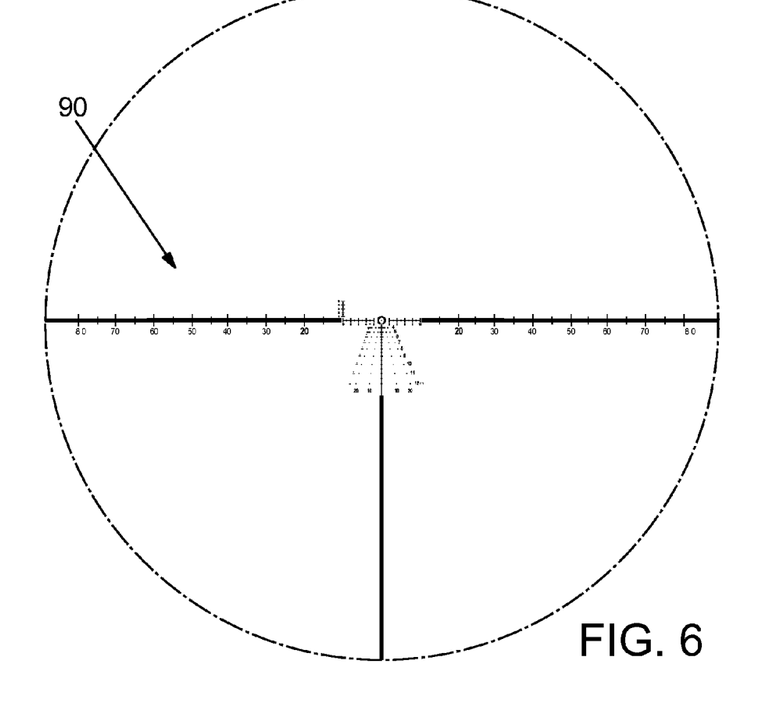
FIG. 6 illustrates a reticle viewed through the optical aiming device of FIG. 1 at a relatively low optical magnification setting.
Figure 7:
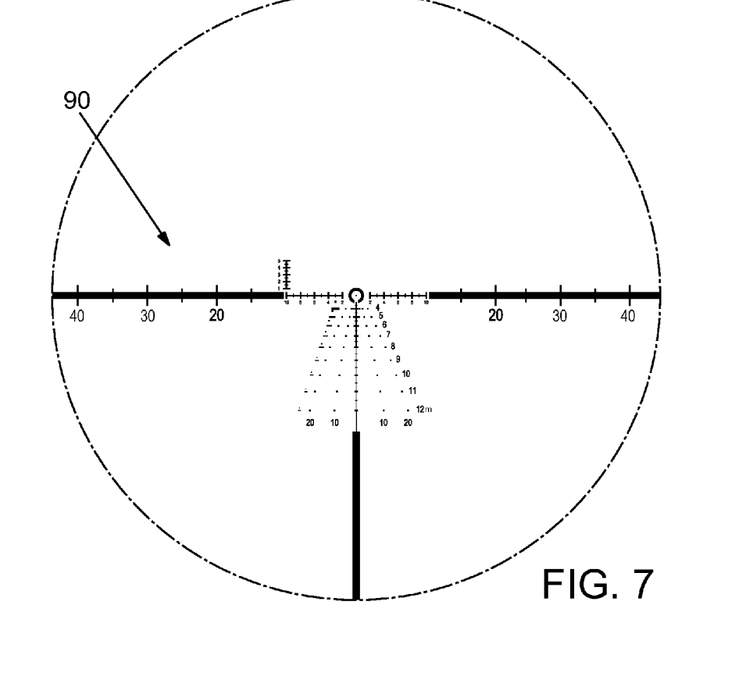
FIG. 7 illustrates the reticle configuration of FIG. 6 viewed through the optical aiming device of FIG. 1 at a relatively high optical magnification setting and showing an alternate reticle pattern.

FIGS. 6 and 7 illustrate an example of scaling a reticle 90 as previously described. In one embodiment, at the lowest magnification setting (i.e., 1× zoom) the reticle 90 is at its largest viewable area and includes the smallest reticle features as illustrated in FIG. 6. Such a viewable area is preferably achieved by illuminating only the pixels that make up the reticle pattern. Scaling the reticle 90 as the magnification increases causes the reticle pattern to change, for example, by illuminating additional pixels to increase the size of the same reticle features, thereby providing a smaller viewable area as illustrated in FIG. 7.

For the example reticle 90 illustrated in FIGS. 6 and 7, considering a change in view progressing from that of FIG. 6 to that of FIG. 7, note that the overall features of the reticle 90 remain essentially the same, but the features are larger and some have been cropped from the viewable area. Similarly, considering a change in view from FIG. 7 to FIG. 6 (such as for a decrease in zoom), the overall features of the reticle 90 pattern remain essentially the same, but the features shrinking and some reticle elements are added to the viewable area. Preferably, the changes to the reticle 90 are linearly proportional to the adjustment of the optical magnification setting of the riflescope 5.

In another embodiment, the reticle pattern 95, may also be altered based on adjustments in optical magnification. In such configuration, the riflescope 5 may have the same or substantially similar components as described with reference to FIG. 1, the difference being in the interaction of the sensor 80, the electronic controller 85, and the display 55. FIGS. 9A-9D illustrate an example embodiment in which the reticle pattern 95 is changed based on adjustments of the optical magnification of the riflescope 5. It should be noted any provided ranges for the optical magnification that may trigger the changes in the reticle pattern 95 are for illustration purposes and not intended to be limiting.

Figure 9A:
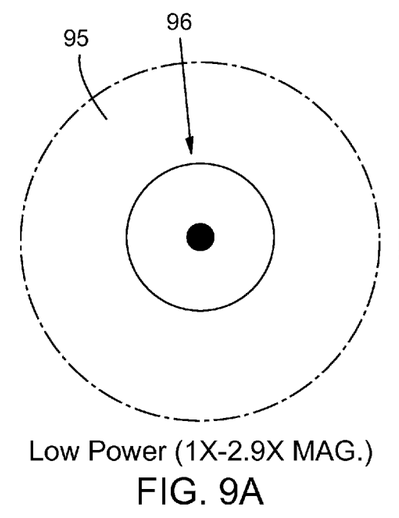
FIGS. 9A-D illustrate exemplary reticle configurations and patterns that may be automatically displayed in response to the magnification setting of an optical device.

With reference to FIGS. 9A-9D, for example, when the optical magnification setting is below a predetermined first threshold, such as below 3× magnification (e.g., between 1× and 2.9× magnification), the reticle pattern 95 includes a first set of multiple marks 96 (such as a circle and/or an aiming dot). Preferably, the reticle pattern 95, formed at least in part by the first set of marks 96, is a type of close-quarters reticle (CQB reticle) having minimal marks 96 to provide a less cluttered viewable area, such as illustrated in FIG. 9A. As used herein, the term "marks" may comprise any of various visually perceptible lines, circles, dots, cross hairs, horseshoe patterns, geometric shapes, characters, numbers, letters, indicia, or symbols.

Figure 9B:
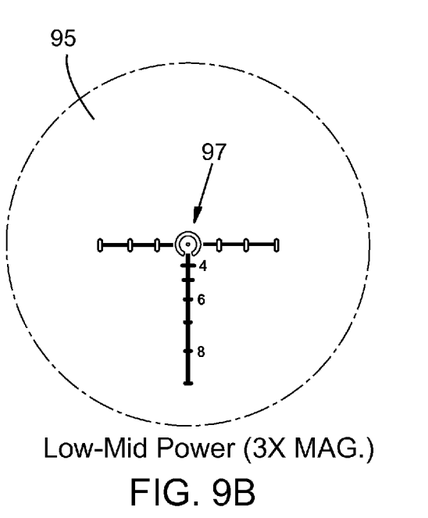

When the optical magnification setting is increased above the first threshold (e.g., to 3× magnification or slightly greater), the electronic controller 85 and the electronic display 55 (in response to a signal received from the sensor 80 or encoder 81) replace the first set of multiple marks 96 from the reticle pattern 95 with a second set of multiple marks 97, which form (at least in part) a second reticle pattern that is distinct from the first reticle pattern and which typically includes at least some different functionality. For instance, the second set of marks 97 may include different aiming features and additional marks, such as relating to estimating distance, calculating windage and elevation adjustments, or other suitable marks commonly used in ranging reticles such as shown in FIG. 9B.

Figure 9C:
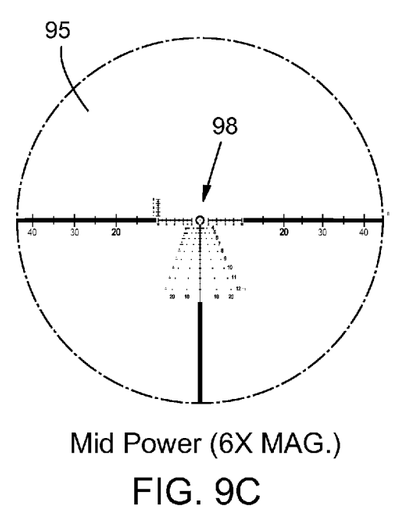

When the optical magnification setting is further increased above a second threshold, such as 6× magnification, the electronic controller 85 and the display 66 replace the second set of multiple marks 97 with a third set of multiple marks 98 that provide functionality different from the functionality of the second set of marks 97, as illustrated in FIG. 9C. For instance, the third set of multiple marks 98 may include both multiple holdover aiming marks spaced apart below the optical center of the reticle pattern and additional sets of multiple windage aiming marks spaced apart to the left and right of the holdover aiming marks for windage adjustments at different target ranges, which may be especially useful at longer shooting distances.

It should be understood that, although the description references three various reticle patterns and changes, any number of reticle patterns 95 may be used. Preferably, the changes in reticle pattern 95 described with reference to FIGS. 9A-9C also occur in reverse as optical magnification is adjusted from high to low.

Figure 9D:
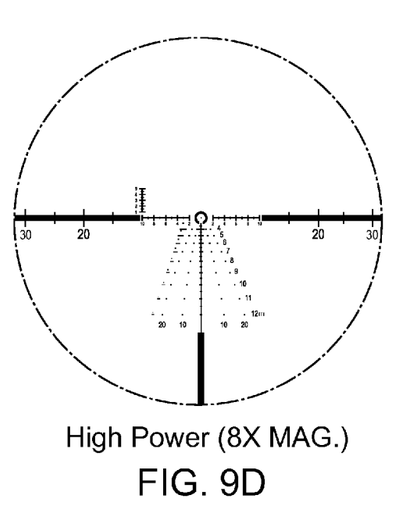

In some embodiments, the reticle pattern 95 may remain essentially the same (that is, the set of multiple marks and features are not replaced) as magnification changes, but the size of the marks and spaces therebetween may be changed or scaled. For example, as optical magnification increases beyond 6× magnification to 8× magnification, the reticle pattern 95 illustrated in FIG. 9C may remain essentially unchanged, but the marks and spaces therebetween of the reticle may increase in size so as to scale the reticle as illustrated in FIG. 9D. In other words, the reticle covers a larger viewable area of the image. Accordingly, in some embodiments the reticle pattern 95 may be kept at the same apparent size below a predefined magnification threshold, then change patterns at the predefined threshold and thereafter increase in size as the magnification is increased above the threshold, or vice versa. Preferably, the reticle pattern 95 remains the same size throughout a lower range of magnification (such as between 1× and 2.9× magnification), or throughout a middle range of magnification (between 3× and 6× magnification), whereas at higher ranges of magnification (such as above 6× magnification) a different reticle pattern is used and is scaled in concert with magnification changes to emulate a FFP reticle. Such a variable electronic reticle 90 may also solve the problem of some reticle configurations or patterns not being suitable for high zoom ratio riflescopes—for example a reticle pattern that has a large collection of very fine aiming marks including holdover and windage aiming points effective for long distance shooting at high magnification, but that is ineffective for close-quarters combat or other shooting at low magnification.

Other suitable magnification ranges or thresholds may be used to trigger the electronic controller to generate the reticle patterns illustrated in FIGS. 9A, 9B and 9C, or other suitable reticle patterns. Fewer or more reticle configurations may be programmed to be displayed, other reticle configurations may be programmed to be displayed, and different reticle patterns may be programmed to be displayed. In other embodiments, the reticle patterns and the sets of multiple marks may be stored in a memory (not illustrated) associated with the electronic controller, may be user-defined (that is, custom made), and/or may be downloaded from another device (not illustrated) communicating with the electronic controller. Examples of distinctly different reticle patterns include circle-dot reticles, mil-dot reticles, simple crosshairs, ballistic drop compensation reticles, and sniper reticles with windage holdover aiming marks.

Embodiments of the reticle systems disclosed herein may thus reduce the need for a military or law enforcement organization to deploy multiple different riflescopes. Any number of reticle patterns or configurations may be programmed and selected by the user, especially when the electronic controller 85/85B is operatively connected to a memory. The riflescope 5/5B may include a means for connecting the memory to an external electronic device to download reticle configurations or patterns from a data storage location on the external electronic device.

In some embodiments, a physical aiming mark may be included on the electronic display 55/55B, on another suitable display or display system, or elsewhere (for example, an opaque or reflective mark on a transparent reticle disk coincident with a focal plane) so that the physical aiming mark may be viewed even when there is no electrical power available to electronically generate reticle 90. For example, a small chrome dot 68 (FIG. 2), preferably having a diameter of approximately 0.5minute of angle (MOA) to approximately 1 MOA, may be etched onto the front surface 66/66B of beam combiner 65/65B. Such a chrome dot 68 is preferably located at a point where the central optical axis 70/70B intersects the front surface 66/66B of beam combiner 65/65B.

An optionally included mark on a display or display system may also be used to align an electronically generated reticle. For example, when the permanent mark is at a known intended position, such as at the center of the front face 66/66B of the beam combiner 65/65B, the position of electronic display 55/55B may be adjusted during assembly until a desired point on the electronically generated reticle aligns with, overlies, or coincides with the permanent mark. For example, a central crosshair intersection portion of the electronic reticle should coincide with the permanent mark. In some embodiments, the active area of the electronic display 55/55B may be adjusted after mounting the display 55/55B to the beam combiner 65/65B until the position of the active area of the display coincides with the location of the permanent mark. Moving, positioning, or adjusting an electronically generated reticle such that a portion of the reticle aligns with, coincides with, or overlies a physical mark on the display or display system may occur before the display or display system is inserted into an optical aiming device (for example, when the display unit is assembled) to pre-align the reticle for alignment with the optical axis prior to scope assembly, and may comprise a combination of physical alignment of the display 55/55B and offset coordinates used by a display driver of the electronic controller.

Although the description above contains much specificity, these details should not be construed as limiting the scope of the invention, but as merely providing illustrations of some embodiments of the invention. It should be understood that subject matter disclosed in one portion herein can be combined with the subject matter of one or more of other portions herein as long as such combinations are not mutually exclusive or inoperable.

It will be obvious to those having skill in the art that many changes may be made to the details of the above-described embodiments without departing from the underlying principles of the invention. The scope of the present invention should, therefore, be determined only by the following claims.

The invention claimed is:

1. A variable power optical sighting device, comprising:
   an objective that produces an image of a distant object at a front focal plane;
   an eyepiece for viewing the image;
   a power-varying lens element;
   a magnification adjustment mechanism coupled to the power-varying lens element for driving the power-varying lens element to adjust an optical magnification of the image of the distant object;
   a sensor operatively associated with the magnification adjustment mechanism to produce a signal indicative of an adjustment of the optical magnification;
   a display of a set of multiple marks disposed proximate the front focal plane of the sighting device and viewable through the eyepiece in a field of view thereof superimposed upon the image of the distant object; and
   an electronic controller in communication with the sensor and operable, in response to the signal produced by the sensor, to adjust the actual size of at least a portion of the set of multiple marks at the front focal plane, in inverse relation to changes in optical magnification, such that the apparent size of the set of multiple marks in the field of view is unaffected by changes in the optical magnification.

2. The optical sighting device of claim 1, wherein the electronic controller continuously adjusts the actual size of at least a portion of the set of multiple marks at the front focal plane in response to the signal indicating continuous adjustments of the optical magnification.

3. The optical sighting device of claim 1, further comprising an electronic display facing a beam combiner disposed proximate the first focal plane.

4. The optical sighting device of claim 3, further comprising an aiming dot marked on a surface of the beam combiner.

5. The optical sighting device of claim 3, wherein the electronic display includes a pixel array for producing the set of multiple marks.

6. The optical sighting device of claim 3, wherein the electronic display includes an OLED pixel array.

7. The optical sighting device of claim 1, wherein the display includes a transparent electronic display positioned in an optical path of the sighting device at the front focal plane.

8. The optical sighting device of claim 7, wherein the transparent electronic display is pixelated.

9. The optical sighting device of claim 1, further comprising:
   an erector assembly located between the front focal plane and the eyepiece, the erector assembly operable to produce an erect image of the set of multiple marks and the distant object at a rear focal plane for viewing via the eyepiece, the erector assembly responsive to the magnification adjustment mechanism to magnify the erect image of the set of multiple marks and the distant object.

10. The optical sighting device of claim 1, wherein the sensor is selected from the group consisting of an electromechanical digital encoder, an optical digital encoder, and a potentiometer.

11. The optical sighting device of claim 1, wherein:
   the set of multiple marks includes a plurality of marks and spaces therebetween, the marks and spaces subtending angles in an object space viewable through the eyepiece of the optical sighting device; and
   the electronic controller is operable to adjust the actual size of the marks and spaces at the front focal plane such that all of the angles subtended in the object space by the marks and the spaces remain unchanged throughout a range of adjustments in the optical magnification.

12. The optical sighting device of claim 1, wherein the signal is indicative of multiple optical magnification settings of the optical sighting device including at least a first magnification setting and a second magnification setting greater than the first magnification setting.

13. The optical sighting device of claim 1, wherein the display of the set of multiple marks includes a reticle.

14. The optical sighting device of claim 1, wherein the set of multiple marks includes numbers or letters.

15. A variable power optical sighting device, comprising:
an objective that produces an image of a distant object at a front focal plane;
an eyepiece for viewing the image;
a power-varying lens element;
a magnification adjustment mechanism coupled to the power-varying lens element for driving the power-varying lens element to adjust an optical magnification of the image of the distant object;
a sensor operatively associated with the magnification adjustment mechanism to produce a signal indicative of an adjustment of the optical magnification;
an erector assembly disposed between the front focal plane and the eyepiece, the erector assembly operable to produce an erect image of the distant object at a rear focal plane between the erector assembly and the eyepiece; and
a display of a set of multiple marks disposed proximate the rear focal plane and viewable through the eyepiece in a field of view thereof superimposed upon the erect image of the distant object;
an electronic controller in communication with the sensor and operable, in response to the signal produced by the sensor, to adjust the actual size of at least a portion of the set of multiple marks at the rear focal plane, and
wherein the erector assembly is responsive to the magnification adjustment mechanism for magnifying the erect image, and the electronic controller is configured to adjust the actual size of the set of multiple marks at the rear focal plane in concert with changes in the optical magnification of the sighting device.

16. The optical sighting device of claim 15, wherein the electronic controller adjusts the actual size of the set of multiple marks at the rear focal plane proportional to adjustments of the optical magnification such that the apparent size of the set of multiple marks in the field of view is changed to the same degree as the apparent size of the object in the field of view.

17. The optical sighting device of claim 15, wherein the electronic controller continuously adjusts the actual size of at least a portion of the set of multiple marks at the rear focal plane in response to the signal indicating continuous adjustments of the optical magnification.

18. A variable power optical sighting device, comprising:
an objective that produces an image of a distant object;
an eyepiece for viewing the image;
a power-varying lens element;
a magnification adjustment mechanism coupled to the power-varying lens element for driving the power-varying lens element to adjust an optical magnification of the image of the distant object;
a sensor operatively associated with the magnification adjustment mechanism to produce a signal indicative of an adjustment of the optical magnification, wherein the signal is indicative of multiple optical magnification settings of the optical sighting device including at least a first magnification setting and a second magnification setting greater than the first magnification setting;
a display of a set of multiple marks disposed proximate a first focal plane of the sighting device and viewable through the eyepiece in a field of view thereof superimposed upon the image of the distant object;
an electronic controller in communication with the sensor and operable to adjust size of at least a portion of the set of multiple marks at the first focal plane in response to the signal produced by the sensor;
wherein the display includes an electronic reticle display in communication with the electronic controller;
wherein the electronic controller is configured to:
produce a first set of multiple marks arranged on the electronic reticle display to form a first reticle pattern in response to the signal indicating the first magnification setting, and
in response to the signal indicating the second magnification setting, remove the first set of multiple marks and to produce a second set of multiple marks on the electronic reticle display to form a second reticle pattern that is distinct from the first reticle pattern.

19. The optical sighting device of claim 18, wherein the electronic controller is configured to, in response to the signal indicating a third magnification setting greater than the first and second magnification settings, replace the second set of multiple marks on the electronic reticle display with a third set of multiple marks different from the second set of marks to form a third reticle pattern distinct from the second reticle pattern.

20. The optical sighting device of claim 18, wherein the first reticle pattern is a close-quarters reticle pattern, and wherein the second reticle pattern is a long-range reticle pattern.

21. The optical sighting device of claim 18, wherein:
the first set of marks includes an aiming dot at an optical center of the electronic reticle display and a circle, or an arc, or a horseshoe shape centered on the optical center; and
the second set of marks includes multiple holdover aiming marks spaced apart below the optical center and multiple windage aiming marks spaced apart to the left and right of the holdover aiming marks.

\* \* \* \* \*